(12) United States Patent
Kobayashi (10) Patent No.: US 7,793,878 B2
(45) Date of Patent: Sep. 14, 2010

(54) FISHING REEL

(75) Inventor: Mikiharu Kobayashi, Tokyo (JP)

(73) Assignee: Globeride, Inc., Tokyo (JP)

( * ) Notice: Subject to any disclaimer, the term of this patent is extended or adjusted under 35 U.S.C. 154(b) by 0 days.

(21) Appl. No.: 12/479,285

(22) Filed: Jun. 5, 2009

(65) Prior Publication Data

US 2009/0314871 A1 Dec. 24, 2009

(30) Foreign Application Priority Data

Jun. 19, 2008 (JP) ............................. 2008-160563

(51) Int. Cl.
*A01K 89/01* (2006.01)
(52) U.S. Cl. ..................... 242/259; 242/257
(58) Field of Classification Search ................ 242/257, 242/259, 263, 267, 268
See application file for complete search history.

(56) References Cited

U.S. PATENT DOCUMENTS

| 5,058,447 | A | * | 10/1991 | Ikuta | 74/371 |
| 5,454,526 | A | * | 10/1995 | Kaneko | 242/255 |
| 6,102,316 | A | * | 8/2000 | Nilsen | 242/255 |
| 6,254,020 | B1 | * | 7/2001 | Nilsen | 242/255 |
| 6,325,315 | B1 | * | 12/2001 | Chang | 242/255 |
| 6,505,787 | B1 | * | 1/2003 | Nilsen | 242/255 |
| 6,830,208 | B2 | * | 12/2004 | Datcuk, Jr. | 242/255 |
| 6,997,409 | B1 | * | 2/2006 | Bledsoe et al. | 242/257 |
| 2009/0277984 | A1 | * | 11/2009 | Wee et al. | 242/257 |

FOREIGN PATENT DOCUMENTS

JP 7-39413 9/1995

* cited by examiner

*Primary Examiner*—Emmanuel M Marcelo
(74) *Attorney, Agent, or Firm*—Pillsbury Winthrop Shaw Pittman, LLP (57) ABSTRACT

A fishing reel comprises a cylindrical handle shaft that rotatably retains a high-speed driving gear and a low-speed driving gear. Inside the handle shaft, a switching shaft is fitted slidably along the axial direction. The fishing reel includes a switching member inside the handle shaft that is selectively engageable with the high-speed driving gear for high-speed winding or the low-speed driving gear for low-speed winding in response to an axial movement of the switching shaft. The switching member having at its one end adjacent to the handle a projection extending inside the handle shaft.

11 Claims, 8 Drawing Sheets

FISHING REEL

CROSS-REFERENCE TO RELATED APPLICATIONS

This application is based upon and claims the benefit of priority from prior Japanese Patent Application No. 2008-160563, filed Jun. 19, 2008, the entire contents of which are incorporated herein by reference.

FIELD OF THE INVENTION

The present invention generally relates to a fishing reel, and more particularly, to a fishing reel provided with a gear assembly that causes a spool, rotatably mounted on a reel body, to switch between high-speed and low-speed winding modes.

BACKGROUND OF THE INVENTION

One conventional fishing reel includes a gear assembly that transmits the rotation of a handle to a spool, causing the spool to rotate in either a high-speed winding mode or low-speed winding mode. It is common that such a conventional gear assembly is provided with a high-speed gear and low-speed gear each rotatably mounted at the inner end of a cylindrical handle shaft to which a handle is attached; a switching shaft having an operating portion at its outer end and fitted inside the handle shaft slidably in an axial direction; a switching member (also referred to as the "movable top") slidably mounted at the inner end of the handle shaft in the axial direction but unrotatably relative thereto. The switching member may be biased by a pair of springs in both axial directions.

In such a gear assembly, the switching shaft may be inwardly plunged against one of the springs to engage the switching member with the low-speed gear. This engagement integrates the handle shaft with the low-speed gear. Thus, the spool is switched to the low-speed winding mode. In order to switch the spool to the high-speed winding mode, a switching lever, attached to a retaining portion of the base of the handle, is pivotally operated to permit the switching shaft to freely move in the axial direction. By this operation, the bias of the spring causes the switching member to move outwardly in the axial direction to engage with the engagement portion of the high-speed gear. This engagement integrates the handle shaft with the high-speed gear, whereby the spool is switched to the high-speed winding mode. The positions of the high-speed and low speed gears may be exchanged.

In moving in the axial direction, however, the switching member may become inclined or slanted relative to the axis due to axially exerted forces by the pair of springs, each of which is arranged at the both sides of the switching member.

To address this issue, Japanese Examined Utility Model Publication No. H7-39413 (hereinafter "413 Publication") discloses an improved gear assembly where a switching member (movable top), having a projection at its inner end, may be fitted into a receiving cylinder arranged at the inner end of a handle shaft to prevent the inclination or slanting of the switching member.

BRIEF SUMMARY OF THE INVENTION

One object of the present invention is to provide a downsized fishing reel having a gear assembly comprising a switching member that selectively engages with a high-speed or low-speed gear.

In order to achieve the object noted above, one aspect of the present invention provides a fishing reel comprising a cylindrical handle shaft rotatably retaining a high-speed gear and a low-speed gear, the handle shaft having a handle; a switching shaft fitted inside the handle shaft in a slidable manner in an axial direction of the handle shaft; a switching member selectively engageable with the high-speed gear for high-speed winding or the low-speed gear for low-speed winding in response to an axial movement of the switching shaft, the switching member having at its end adjacent to the handle a projection extending inside the handle shaft; and a spring member fitted inside the handle shaft, wherein the spring member biases via the switching shaft the switching member in both axial directions of the handle shaft.

According to one aspect of the present invention noted above, the spring member is fitted insides the handle shaft so as to bias the switching member in both axial directions of the handle shaft for high-speed or low-speed winding. This leads to efficient use of the space inside the handle shaft. Thus, it can be avoided that the interior space of the sidewall of the reel body is getting bigger, thereby allowing the entire reel body to become downsized. Accordingly, a fishing reel having a gear assembly that allows the body of the fishing reel to be compact is provided.

DETAILED DESCRIPTION OF THE INVENTION

Referring to FIGS. 1-6, the first embodiment of the present invention will be described.

Figure 1:
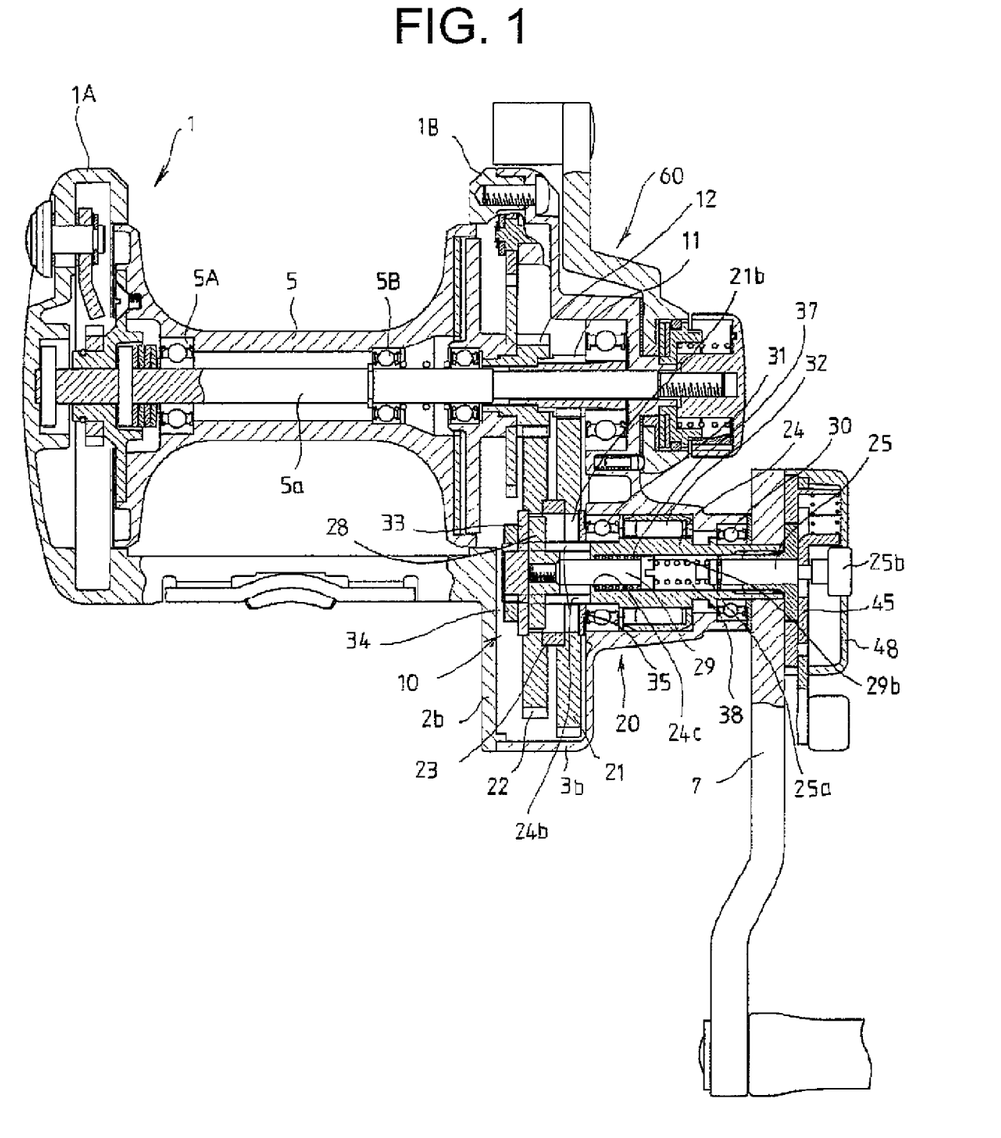
FIG. 1 illustrates the interior structure according to the first embodiment of the present invention.

A reel body 1 according to this embodiment comprises a left sidewall 1A and right sidewall 1B that cooperate to rotatably support a spool 5. The spool 5 is designed to accommodate the winding of a fishing line. Attached to right sidewall 1B is a handle 7 that rotates spool 5. Rotating handle 7 rotatably drives spool 5 via a power transmission mechanism 10.

The right sidewall 1B comprises a frame 2b and a cover 3b, that is mounted on frame 2b such that cover 3b covers frame 2b. Between frame 2b and cover 3b exists a space that accommodates power transmission mechanism 10 for transmitting drive power by handle 7 to spool 5.

The power transmission mechanism 10 includes a gear assembly 20 to achieve the switching operation between the high-speed and low-speed winding modes. The spool 5 is rotatably retained on or around spool shaft 5a via a pair of bearings 5A and 5B. A conventional drag mechanism 60 may adjust spool 5 between one state where the spool 5 may rotate integrally with the spool shaft 5a and another state where the fishing line may be freely unwound. This state where the fishing line may be freely unwound is referred to the "free rotation state".

Figure 2:
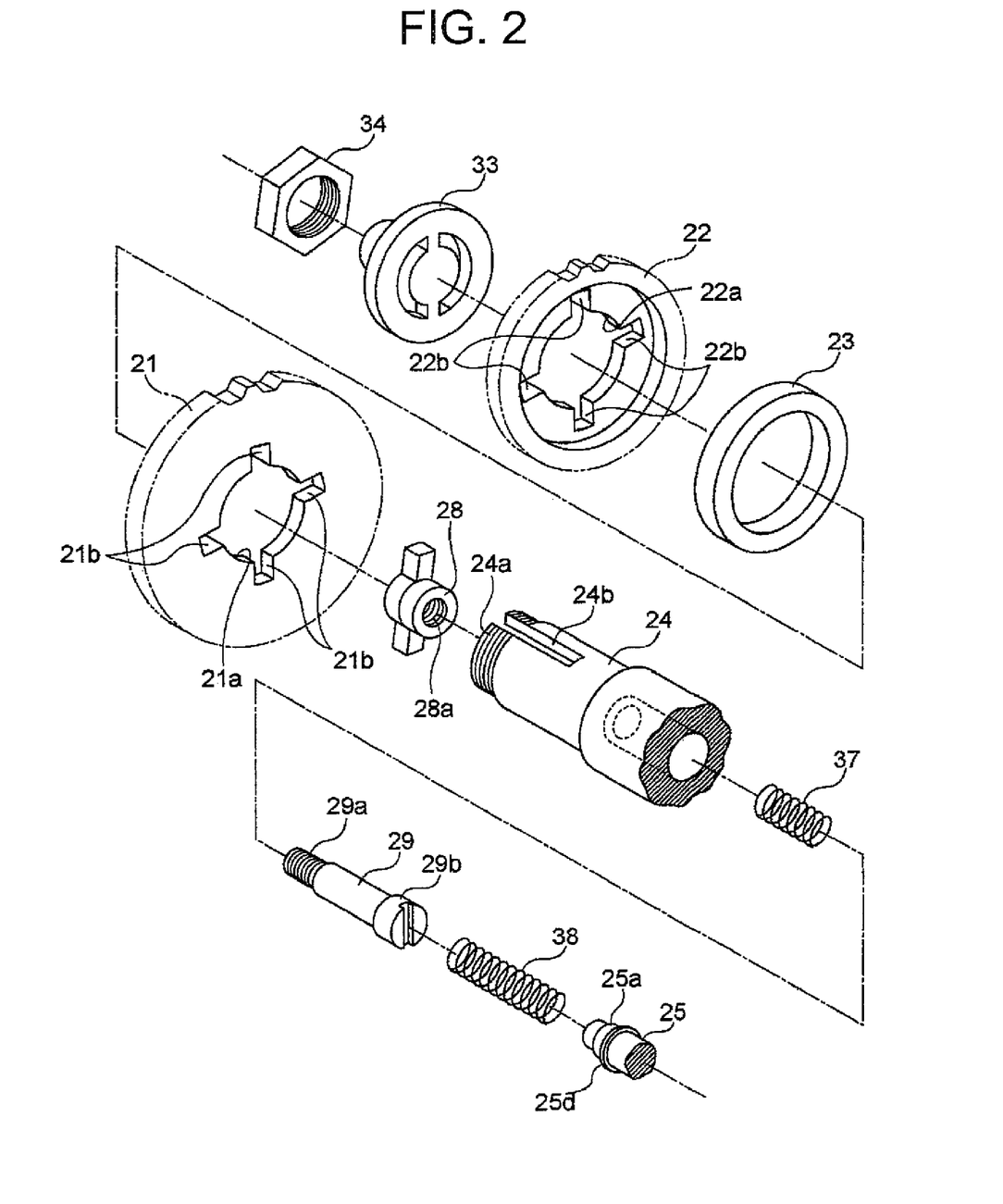
FIG. 2 is an exploded perspective view illustrating the structure of the gear assembly fitted to the fishing reel illustrated in FIG. 1.

The gear assembly 20 comprises a high-speed driven gear 11 and a low-speed driven gear 12. The gear assembly 20 also comprises a high-speed driving gear 21 and a low-speed driving gear 22. The high-speed driving gear 21 is configured to mesh with the high-speed driven gear 11; and the low-speed driving gear 22 is configured to mesh with the low-speed driven gear 12.

The gear assembly 20 further comprises a cylindrical handle shaft 24, a switching shaft 25 and a switching member 28. The switching member 28 may also be referred to as a movable top. A handle 7 is attached to handle shaft 24 at one end extending out of the cover 3b. At its butt end, handle shaft 24 rotatably retains high-speed driving gear 21 and low-speed driving gear 22. The switching shaft 25 is fitted inside the handle shaft 24 in a slidable manner along the axial direction of handle shaft 24. In response to an axial movement of the switching shaft 25, the switching member 28 is selectively engageable with high-speed driving gear 21 or low-speed driving gear 22. This selectable engagement of the switching member 28 achieves the switching operation between high-speed winding and low speed winding.

The handle shaft 24 may be rotatably retained by the cover 3b via a pair of bearings 30 and 31. The handle shaft 24 may be configured such that a reverse rotation restriction device 32 restricts the rotation thereof only in the fishing line winding direction. The reverse rotation restriction device 32 may comprise a one way clutch.

Intervening between high-speed driving gear 21 and low-speed driving gear 22, is a collar 23 that keeps the gears axially separated from one another. At the butt end of the handle shaft 24, a male screw 24a is formed that is threadably engageable with a nut 34. A spacer 33 is interposed between nut 34 and low-speed driving gear 22. In addition, a supporting plate 35 is interposed between high-speed driving gear 21 and bearing 31. In this manner, high-speed driving gear 21 and low-speed driving gear 22 is retained on handle shaft 24 in a rotatable but axially limited manner.

Thus, high-speed driving gear 21 and low-speed driving gear 22 may be positioned relative to handle shaft 24; and handle shaft 24 is rotatably retained on cover 3b in such a manner that handle shaft 24 cannot fall off.

Formed respectively in the central areas of high-speed driving gear 21 and low-speed driving gear 22 are through-holes 21a and 22a through which handle shaft 24 passes. Also formed on high-speed driving gear 21 and low-speed driving gear 22 are fitting portions 21b and 22b which switching member 28 is fitted to or engaged with. The fitting portions 21b and 22b may be referred to as the "engagement portion". As shown in FIG. 2, switching member 28 includes a pair of arms radially extending from the rotation center of the handle shaft 24. To accommodate those arms, the fitting portions 21b and 22b each include radially extending cutouts formed at an angular interval of 90°. Thus, switching member 28 may be engaged with either high-speed driving gear 21 or low-speed driving gear 22 by rotating the handle shaft 24 at 90° or less, thereby enabling power transmission.

The switching member 28 is fitted inside handle shaft 24. A pressing operation of switching shaft 25 axially displaces switching member 28 in concert with a spring member as described hereinafter. To this end, a pair of axially elongated grooves 24b are formed at the butt end of handle shaft 24 so that switching member 28 can translate in the axial direction.

Formed on switching shaft 28, is a projection 29 extending towards one end of handle shaft 24 at which handle 7 is attached. That end of handle shaft 24 may be referred to as the "handle end". The projection 29 is formed as an independent element in the shape of bolt. Formed at one end of projection 29 is a male screw 29a threadably engageable with a female screw 28a that is formed on switching member 28. The projection 29 is configured to be integrated with switching member 28 by threadably engaging the projection 29 with switching member 28. As described hereinafter, projection 29 according to the second embodiment of the present invention may be formed integrally with switching member 28.

Formed at the front end of projection 29 is a slide contact portion 29b that may be slidably fitted inside the handle shaft 24 in abutting contact with the inner periphery of handle shaft 24. The slide contact portion 29b also works as a screw head. The outer periphery of the slide contact portion 29b contacts or may contact inner periphery of the handle shaft 24. On the inner periphery of handle shaft 24, a flange 24c is formed at the position displaced in the axial direction from the elongated grooves 24b towards the handle end.

The switching member 28 is biased in both axial directions by a spring member that is fitted inside the handle shaft 24 via projection 29. In particular, while switching member 28 is biased in the direction towards the handle end of handle shaft 24 (i.e., the direction approaching the high-speed driving gear 21) by a compression spring 37 that is interposed between flange 24c and slide contact portion 29b, switching member 28 is biased in the direction opposite to the handle end (i.e., the direction approaching low-speed driving gear 22) by a compression spring 38 that is interposed between a flange 25a and slide contact portion 29b. The compression springs 37 and 38 may be herein referred to as "first spring" and "second spring" respectively. The flange 25a is formed at the inner end of switching shaft 25.

The switching shaft 25 extends in the axial direction. The outer end of the switching shaft 25 is exposed from a circular cover 48 attached to handle 7. Outer end of the switching shaft 25 may be herein referred to as "operating portion 25b". A pressing operation of the operation portion 25b causes switching member 28 to engage with the low-speed driving gear 22. A rotating operation of a switching lever 50, engaged with the switching shaft 25, causes switching member 28 to engage with high-speed driving gear 21.

The structure of the switching shaft 25 will be described hereinafter in greater detail with reference to FIGS. 3-6.

Figure 3A:
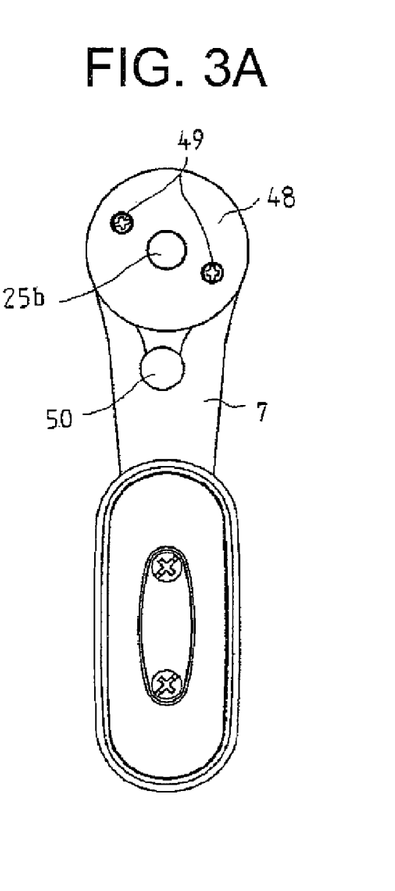
FIG. 3A is a side view of a handle portion of the fishing reel illustrated in FIG. 1.

The handle 7 is formed in the shape of a lever and attached to handle shaft 24 by fitting a nut 42 to the open end of handle shaft 24. The outer periphery of nut 42 is formed to have circumferentially continuous concavity and convexity 42a to which a seat 43 is unrotatably secured.

The seat 43 retains a slidable member 45 in a slidable manner in the direction perpendicular to the axial direction of handle shaft 24. As shown in FIG. 3, slidable member 45 is constantly biased downwardly by a bias spring 46 interposed between the slidable member 45 and a projection 43a projecting outwardly from the seat 43. The circular cover 48 is threadably attached to handle 7 using screws 49 to cover nut 42, seat 43, and bias spring 46.

Figure 3B:
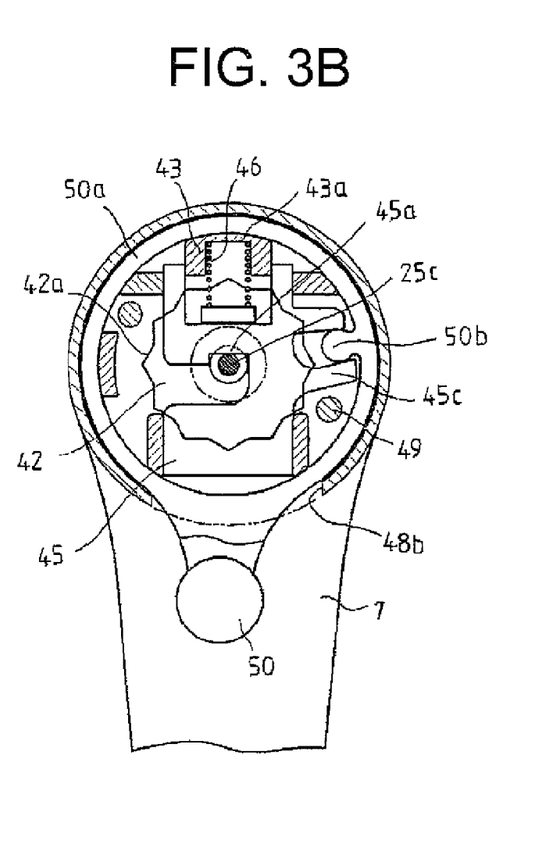
FIG. 3B is a cross sectional view illustrating the interior structure of the butt portion of the handle illustrated in FIG. 3A.

In the center of cover 48, an opening 48a is formed from which one end of the switching shaft 25 is exposed.

Figure 6:
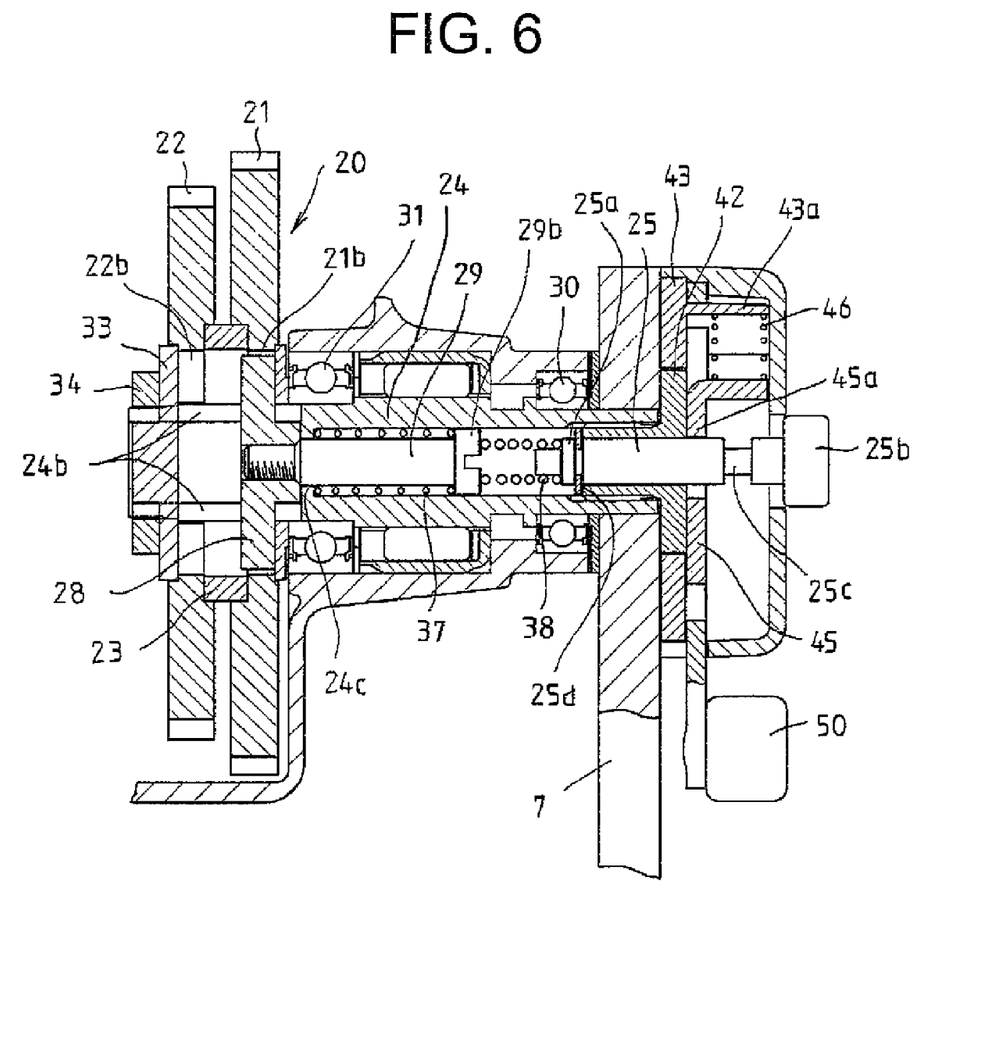
FIG. 6 illustrates the switching member in engagement with the high-speed gear according to the first embodiment of the present invention.

Formed in the center of slidable member 45, is an engagement portion 45a configured to be engageable with outer periphery of switching shaft 25. As shown in FIG. 6, slidable member 45 is configured to impinge on the outer periphery of switching shaft 25 in the condition that compression spring 37 displaces switching shaft 25 towards the handle end. In this condition, switching member 28 engages with high-speed driving gear 21 for high-speed winding; and operating portion 25b projects from the circular cover 48 for easy pressing operation.

Figure 4:
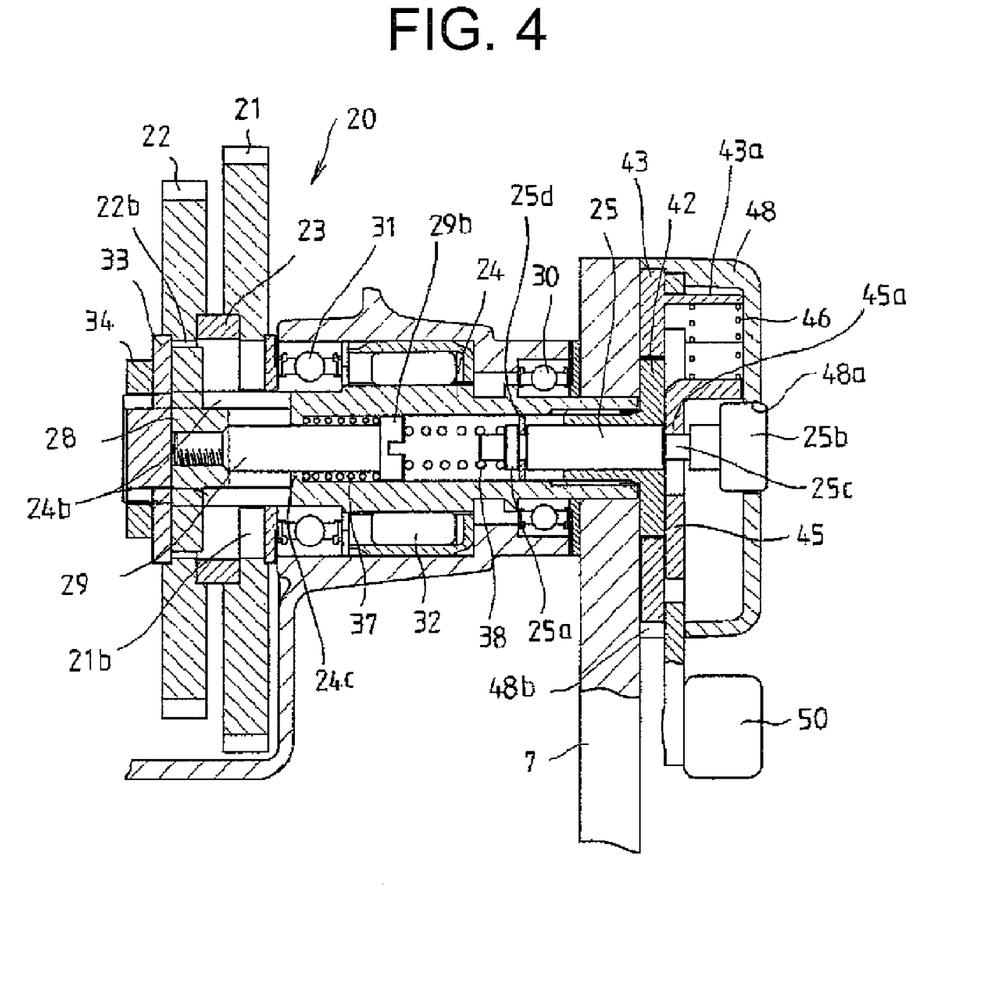
FIG. 4 illustrates the switching member in engagement with the low-speed gear according to the first embodiment of the present invention.
Figure 5:
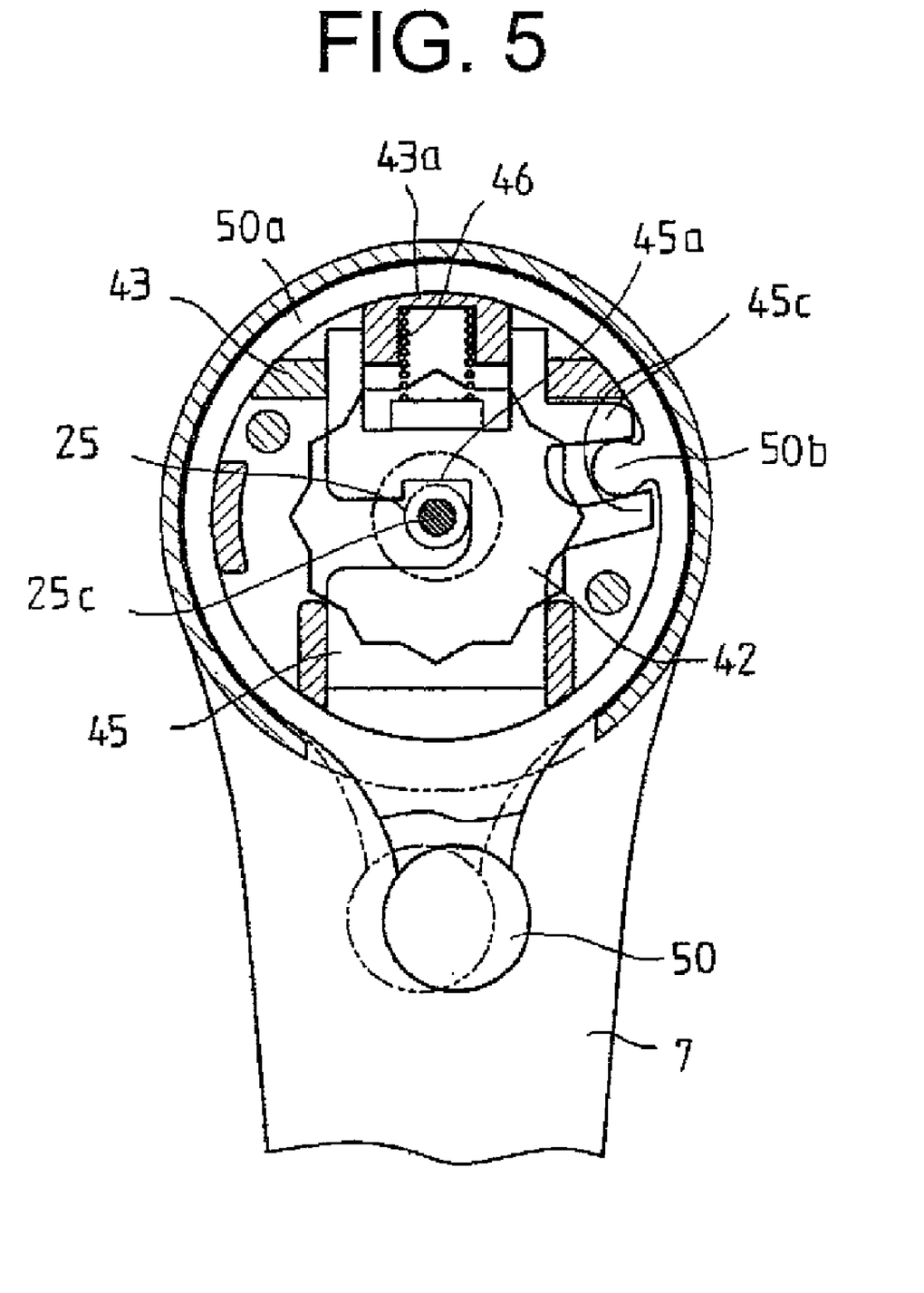
FIG. 5 is a cross sectional view illustrating the interior structure of the butt portion of the handle illustrated in FIG. 3A where the switching lever is pivotally operated to switch to high-speed winding mode.

The switching shaft 25 includes a reduced diameter portion 25c. The pressing operation of operating portion 25b allows engagement portion 45a to engage with the reduced diameter portion 25c and retain the position of switching shaft 25 under the bias from bias spring 46. In this condition, as shown in FIG. 4, switching member 28 is displaced in the direction opposite to the handle end to engage with low-speed driving gear 22 for low-speed winding.

A pivotable portion 50a is arranged around seat 43. The pivotable portion 50a is formed in the shape of ring. A switching lever 50 is integrally formed with the pivotable portion 50a at its lower end. The switching lever 50 is configured to project from an arc opening 48b that is formed in the lower end of the cover 48. The pivotable portion 50a has on its inner surface a bump 50b engageable with a clip 45c that is formed on slidable member 45.

When the switching lever 50 is rotated in counter-clockwise direction from the position illustrated in FIG. 3B (also illustrated in FIG. 5 by dashed line), bump 50b cooperates with clip 45c to cause slidable member 45 to move upwardly against the bias by bias spring 46, thereby terminating the engagement relationship between engagement portion 45a and reduced diameter portion 25c. As a result, the bias by first spring 37 displaces switching member 28 towards the handle end to switch to high-speed winding mode as shown in FIG. 6.

Next, the operation and advantageous effect of the fishing reel according to this embodiment will be described below.

As shown in FIGS. 1-4, when operating portion 25b is pushed inside, bias spring 46 will bias the engagement portion 45a to engage with the reduced diameter portion 25c of switching shaft 25. This engagement between engagement portion 45a and reduced diameter portion 25c retains the position of switching shaft 25. As a result, the switching member 28 is displaced in the direction opposite to the handle end to engage with low-speed driving gear 22 for low-speed winding as shown in FIG. 4.

The rotational driving power of handle 7 is transmitted via the engaged low-speed driving gear 22 and low-speed driven gear 12 to spool 5 (or spool shaft 5a), thereby driving spool 5 in the low-speed winding mode.

When switching lever 50 is rotated in counter-clockwise direction from the position illustrated in FIG. 3B (also illustrated in FIG. 5 by dashed line), bump 50b cooperates with clip 45c to cause slidable member 45 to move upwardly against the bias by bias spring 46, thereby terminating the engagement relationship between engagement portion 45a and reduced diameter portion 25c. In this case, as shown in FIG. 6, the bias by compression spring 37 moves switching member 28 towards handle 7 along grooves 24b to engage with high-speed driving gear 21. Simultaneously, switching shaft 25 is moved towards handle 7 to cause O-ring 25d, fitted to flange 25a, to contact with nut 42. This contact retains the position of switching shaft 25. This movement of switching shaft 25 allows operating portion 25b to project from the surface of circular cover 48.

Thus, gear assembly 20 switches power transmission mechanism 10 between high-speed and low-speed winding modes in response to pressing operation of operating portion 25b and rotation of switching lever 50.

As noted above, handle shaft 24 is configured to accommodate therein a spring member, comprising first spring 37 and second spring 38, that biases switching member 28 for switching high-speed and low-speed winding modes. This configuration allows the space inside handle shaft 24 to be used effectively, thereby preventing the space inside the sidewall (right sidewall 1B) from getting larger in size. Thus, the reel body may be downsized.

In addition, switching member 28 comprises projection 29 that has slide contact portion 29b with enlarged diameter. When switching member 28 moves in the axial direction, the slide contact portion 29b slide in abutting contact with the inner periphery of handle shaft 24 to allow switching member to move smoothly and to prevent switching member 28 from becoming inclined or slanted relative to the axis. Thus, stable movement and attitude control of switching member 28 can be realized, thereby achieving smooth switching operation.

Furthermore, compared with the conventional gear assembly described in the 413 Publication that needs to configure a nut to have cylindrical portion, gear assembly 20 of this embodiment needs not include such a configuration because projection 29 can function not only to control the attitude of switching member 28 but also to receive the spring member. Thus, the structure and configuration of gear assembly 20 can be simplified.

Figure 7:
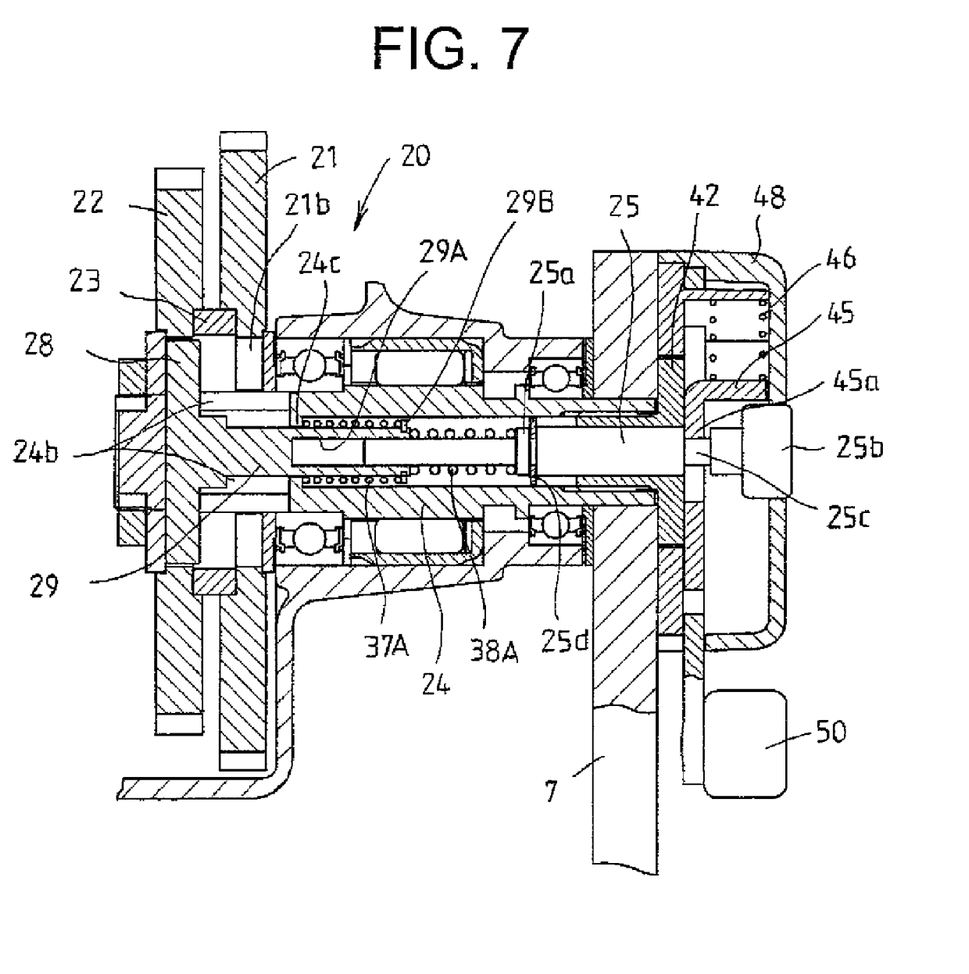
FIG. 7 illustrates the gear assembly operating in the low-speed winding mode according to the second embodiment of the present invention.
Figure 8:
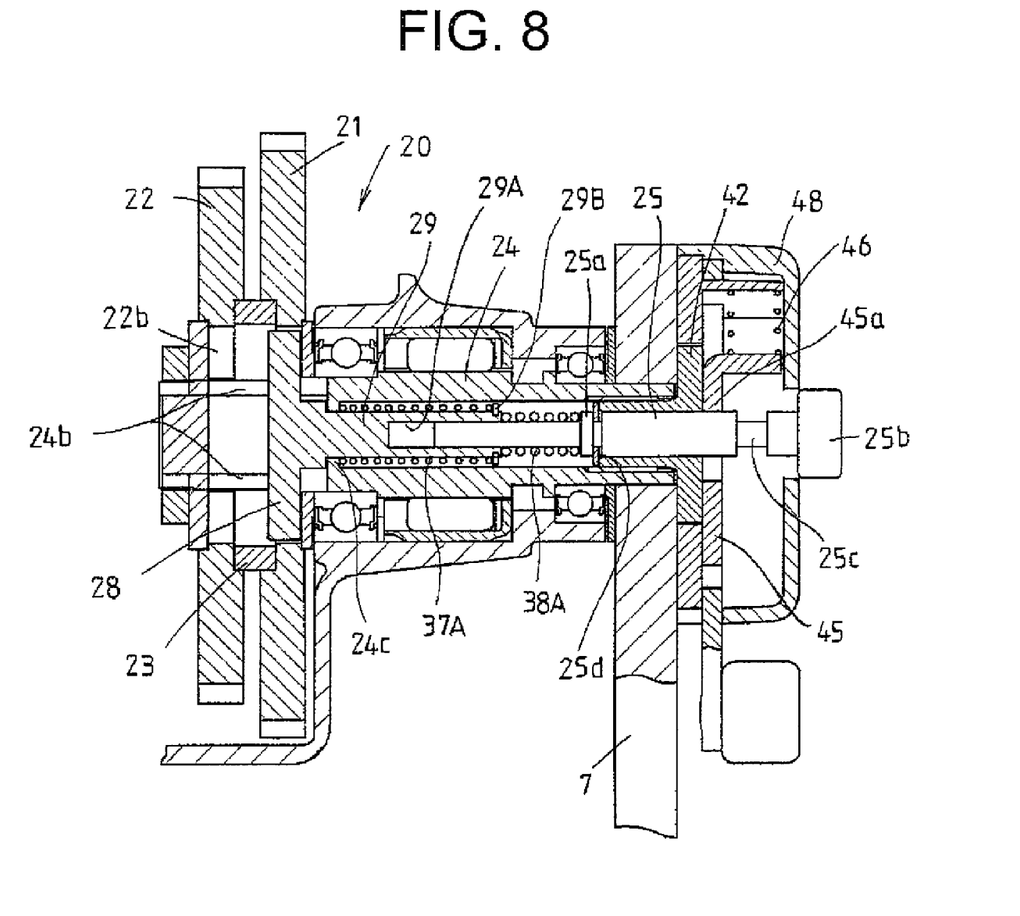
FIG. 8 illustrates the gear assembly operating in the high-speed winding mode according to the second embodiment of the present invention.

Referring now to FIGS. 7 and 8, the second embodiment of the present invention will be described below.

In this embodiment, projection 29 is formed integrally with switching member 28; and a hole 29A extending in the axial direction is formed on projection 29. The hole 29A insertably receives switching shaft 25. The switching shaft 25 is configured to slidably move along the inner wall of hole 29A in abutting contact therewith. The gear assembly 20 of this embodiment comprises compression spring 37A and compression spring 38A. The compression springs 37A may be referred to as the first spring; and the compression springs 38A may be referred to as the second spring. The compression spring 37A is interposed between flange 24c and a stopper ring 29B formed at the top end of projection 29. The compression spring 38A is interposed between flange 25a and the top end face of projection 29.

Thus, the inner wall of hole 29A is configured to slide along the outer periphery of switching shaft 25 in abutting contact therewith when switching member 28 moves in the axial direction, thereby preventing switching member 28 from being inclined or slanted relative to the axis.

In addition, handle shaft 24 is configured to accommodate therein the spring member, comprising first spring 37A and second spring 38A, that biases switching member 28 for switching high-speed and low-speed winding modes. This configuration allows the reel body to be downsized.

Having described the preferred embodiments of the present invention herein, it is to be understood that other embodiments may be utilized and structural changes may be made without departing from the scope of the present invention.

For example, the arrangement of the spring member, arranged inside handle shaft 24, may be subject to various changes. In addition, the position of high-speed driving gear 21 and low-speed driving gear may be exchangeable with each other. The mechanism that terminates the engagement relationship with switching shaft 25 to switch high-speed driving gear 21 and low-speed driving gear (i.e., switching mechanism including switching lever 50) may be changed in various ways.

What is claimed is:

1. A fishing reel comprising:
   a cylindrical handle shaft rotatably retaining a high-speed gear and a low-speed gear, the handle shaft having a handle;
   a switching shaft fitted inside the handle shaft in a slidable manner in an axial direction of the handle shaft;
   a switching member selectively engageable with the high-speed gear for high-speed winding or the low-speed gear for low-speed winding in response to an axial movement of the switching shaft, the switching member having, at its end adjacent to the handle, an axial portion axially extending inside the handle shaft such that at least a part of an outer periphery of the axial portion faces an inner periphery of the handle shaft; and
   a pair of spring members, wherein each of the pair of spring members is disposed inside the handle shaft, wherein the pair of spring members bias via the axial portion the switching member in both axial directions of the handle shaft.

2. The fishing reel according to claim 1, wherein the pair of spring members comprise a first spring and second spring, the first spring being arranged to bias the switching member in a direction towards the handle, the second spring being arranged to bias the switching member in a direction away from the handle.

3. The fishing reel according to claim 2, wherein the axial portion includes a slide contact portion that is slidably fitted inside the handle shaft in abutting contact with the inner periphery of the handle shaft.

4. The fishing reel according to claim 3, further comprising a first flange that is formed on the inner periphery of the handle shaft, wherein the first spring is interposed between the first flange and the slide contact portion.

5. The fishing reel according to claim 4, further comprising a second flange that is formed at an inner end of the switching shaft, wherein the second spring is interposed between the second flange and the slide contact portion.

6. The fishing reel according to claim 2, wherein the switching member includes a hole that insertably receives the switching shaft such that the switching shaft slidably moves in abutting contact with an inner periphery of the hole.

7. The fishing reel according to claim 6, wherein the hole is formed on the axial portion.

8. The fishing reel according to claim 7, further comprising:
   a first flange that is formed on the inner periphery of the handle shaft; and
   a stopper that is formed on the outer periphery of the axial portion;
   wherein the first spring is interposed between the first flange and the stopper.

9. The fishing reel according to claim 8, further comprising a second flange that is formed at an inner end of the switching shaft, wherein the second spring is interposed between the second flange and a distal end surface of the axial portion.

10. The fishing reel according to claim 1, wherein a pair of axially elongated cutouts are formed at an inner end of the handle shaft along which the switching member moves in conducting switching operation.

11. The fishing reel according to claim 1, wherein the axial portion is made integral with the switching member.

\* \* \* \* \*